United States Patent [19]

Gillett et al.

[11] 4,318,941

[45] Mar. 9, 1982

[54] COATING OF SOLIDS

[75] Inventors: John E. Gillett, Gawsworth; John Isherwood, Congleton; Richard A. Hann, Frodsham, all of England; Philip Norton-Berry, Llandegla, Wales; Margaret L. Steel, Runcorn, England

[73] Assignee: Imperial Chemical Industries Limited, London, England

[21] Appl. No.: 120,328

[22] Filed: Feb. 11, 1980

[30] Foreign Application Priority Data

Feb. 21, 1979 [GB] United Kingdom ............... 06082/79

[51] Int. Cl.³ ............................................. B01J 2/00

[52] U.S. Cl. ..................................... 427/212; 118/303

[58] Field of Search .................... 118/303; 239/214.17, 239/214.25, 223; 427/212

[56] References Cited

U.S. PATENT DOCUMENTS

| | | | |
|---|---|---|---|
| 3,033,159 | 5/1962 | O'Brien | 118/303 |
| 3,198,655 | 8/1965 | Gisiger | 118/303 |
| 3,288,052 | 11/1966 | Hough | 118/303 |
| 3,359,942 | 12/1967 | Prince | 118/303 |

FOREIGN PATENT DOCUMENTS

| | | | |
|---|---|---|---|
| 444833 | 3/1936 | United Kingdom | 118/303 |

*Primary Examiner*—Sam Silverberg

*Attorney, Agent, or Firm*—Cushman, Darby & Cushman

[57] ABSTRACT

A process wherein solid particles are coated with either liquids or solids while the particles are moving as a uniform layer over the surface of a rotating body and subsequently discharged from the surface by centrifugal force. Two forms of coating apparatus designed to coat prills are shown, the preferred apparatus having a flexible conical disc carrying a layer of existing material which touches the rim of the rotating body from which the solid is discharged.

8 Claims, 2 Drawing Figures

COATING OF SOLIDS

BACKGROUND AND SUMMARY OF THE INVENTION

This invention relates to a process for the coating of solid particles.

It is known to coat solid particles or pellets in a rotating vessel especially using a tumbling or churning action to achieve uniform spread of coating material over the surface of the solid. We have found that greater uniformity of coating of solid particulate matter is obtained if during the coating process the solid particles are not tumbled or churned but roll or slide uniformly as a layer across a surface of rotation of a body rotating at high speed.

According to the present invention we provide a process for coating the particles of a particulate solid material, a process wherein (a) the particulate solid material is supplied to a supply zone on the surface of a rotating body, the surface being a surface of rotation facing towards the axis of rotation of the body (b) due to the acceleration imparted by the rotation of the body the particles of the solid material are caused to travel across the surface of rotation from the supply zone to a discharge zone axially remote from the supply zone (c) coating material is brought into contact with the particulate solid and distributed over the surface thereof during its travel across the surface of rotation and (d) particles of the solid coated with coating material are discharged from the surface at the discharge zone using forces generated by the rotation of the body.

Examples of suitable rotating bodies are tubular vessels, conical or frusto-conical vessels preferably having a small deviation only from a cylindrical form, bowls or jars preferably having a curved concave surface as hereinafter described, their internal surfaces of rotation in all cases having a central axis. In such bodies the supply zone of the surface (which may be for example at or near to the central axis) and the discharge zone (which may be at or near to the circumference) will be axially displaced with respect to each other. The rotation of the body will generate forces which will operate on a particulate solid supplied to the surface, forces which include mainly a centrifugal force operating radially from the axis of rotation and a rotary force operating circumferentially at the surface of rotation. The rotary force overcomes any inertia of the solid particles on the surface and imparts a rotary motion to them due to frictional drag between the various surfaces. The surface of the rotating body is preferably a smooth, hard non-adherent surface; often a polished surface finished to a highly reflective surface is especially useful.

Without prejudice to the process of the present invention we believe that the centrifugal force operates in a direction away from the axis of rotation but perpendicular to that axis, and thus will tend to force the particulate solid towards the internal surface of rotation and thereby spread the particles of the solid across the surface. If a fresh supply of solid particles is provided to the supply zone of the surface whilst the body is rotating the spreading action of the centrifugal force will tend to operate away from that supply zone. If the particulate solid is supplied to the bottom of the rotating cup or jar the forces generated by the rotation, especially the centrifugal force, will form a layer of particles which will spread outwardly from the axis of rotation and move as a fairly uniform layer towards the rim of the cup or jar from which the particles will be discharged. This movement towards the rim of the cup or jar is a movement which is at least partially in an axial direction, i.e. upwardly if the jar is upright with a vertical axis and the particulate solid supplied to the base. However, the jar may be inverted and then the motion towards the rim will be downwardly.

The axis of rotation may be other than vertical although the vertical is the most convenient direction for the axis of rotation. The rotary propulsion may be applied to the body by a shaft from either end of the axis (e.g. from the top or the bottom if it is a vertical axis) or by other means e.g. turbo-propulsion.

The magnitude of forces generated by the rotation of the body which operate upon the particulate solid to move it across the surface will be dependent upon many factors which include the speed of rotation and the radius of the surface of rotation. The greater the speed of rotation and the greater the radius the larger is the centrifugal force.

The rate of supply of particulate solid to the surface of rotation is also a factor which affects the process. The faster the supply the thicker is the layer formed on the surface assuming other factors such as the particle size and speed of rotation are not varied.

The product may be discharged from the surface in a variety of ways for example by a scoop or knife blade in contact with the surface at the discharge zone or by sucking particles from a well. The preferred method is to use the centrifugal force to throw the products from the surface. It is convenient to place collecting apparatus around the rotating body to receive the product, the apparatus taking whatever form is appropriate to the type of product obtained. Electrostatic charges may be used as an aid to the collection of products, especially of fine particles.

The particulate solid may consist of small or large particles for example ranging from powders with particle dimensions of ca. $10\mu$–$1000\mu$ diameter up to prills and pellets of several millimeters in diameter. The solid is preferably a free-flowing solid not apt to cake or block i.e. the particles have little tendency to adhere one to another or to surfaces with which they come into contact. Thus the particulate solid (which may ideally be granules or prills of a synthetic product for example a drug, medicament, fertiliser, pesticide or foodstuff, or other chemical active in the biological sphere) will be normally in a dry condition and will slide or roll uniformly over the surface of the rotating body as a solid layer of moving particles in the process of this invention. However, cohesive powders annd granules can be advantageously handled by this process and the forces generated by the rotation are used effectively to break down the cohesiveness and spread the particles uniformly on the surface.

Many different shapes of particles may be successfully moved across the surface as the body is rotating; some faster than others. For example spherical particles may be especially rapid and require very little acceleration imparted to them. However, the fastest particles may not be the easiest to coat uniformly: it is desirable to be able to obtain a mono-layer of close packed particles over at least part of the surface of rotation and in some cases this is easier to obtain when particles are slow moving.

The shape of the surface of rotation on which the solid particles are moved may be designed to make it relatively easy to obtain a mono-layer of close packed particles. An internal surface of a vessel of circular cross-section and having concavity in the axial direction so that the sides become steeper as the particulate solid moves nearer to the discharge zone is a preferred shape. Thus the particles are moved radially outward from the supply zone quickly on the shallow portion of such a surface but their progress is slowed down on the steeper portions of the surface. The layer becomes more uniform as the radial movement slows down but further supplies of particles from the supply zone continually arrive to maintain a steady flow as the uniform layer across the surface towards the discharge zone. The preferred shape for the surface often approximates to a parabola in the axial direction. The angle which the surface makes with the axis becomes smaller and tends to zero towards the discharge zone but in this preferred form the angle never equates to zero. We prefer a surface in which the curvature in the axial direction is such that the rate of increase in the diameter of the surface of rotation slows down uniformly towards the discharge zone.

The coating material may be a fluent-solid, a molten solid, a liquid or a fluid emulsion but it is preferably a solution of a solid in a liquid solvent. The coating laid down may be a film-forming polymeric material which would form an encapsulating layer or skin over each of the particles of the particulate solid to be coated or it may be a powdery solid which on evaporation of the solvent would form a powdery or sintered coating on the particulate solid. In this latter form the two solids should be adherent so that the coating remains on the particulate solid and to this end an adhesive material e.g. a viscous liquid or gum may be added to the coating solution. In certain circumstances the coating is an active material and for reasons of handling or dispersion it may be often useful to lay it over a non-active core or substrate.

The coating material may be supplied in a variety of ways the more convenient being a spray or a jet directed to the surface on which the particulate solid is moving. The spray may be an atomised spray produced for example from a rotating cup, disc or cove or by an electrostatic spray device.

Another preferred method is to apply the coating as a thin layer of coating material which is brought into contact with the solid particles to be coated, preferably as they are about to be discharged from the surface of rotation on which they are moving. The thin layer of coating material is conveniently produced on a second rotating surface, the periphery of which approaches close to or touches the rim of the vessel on which the solid particles are spread. We prefer the second rotating surface to be the surface of a stiff yet resilient member for example a member in the form of a core, disc or saucer suitably mounted co-axially with the other surface of rotation and arranged to be rotated independently thereof. For many applications it is preferable to rotate the two in opposite directions or at very different speeds. In a preferred embodiment the coating material in the form of a solution is applied to the surface of a rotating cone of flexible material whose modulus and dimensions are chosen to give the requisite stiffness, for example an 80 mm diameter cone of oriented polyester film of thickness ca. 0.4 mm is quite suitable or a thinner stainless steel sheet of ca. 0.1 mm may be used. The circumference of this cone is arranged to press lightly against the rim of the bowl from which the solid particles are about to be discharged. Thus the coating solution on the flexible cone is transferred to the solid particles by a rolling action of one surface over the other in the discharge zone, the surfaces being resiliently urged together in order to prevent solid particles being discharged without being coated.

A low partial pressure for the volatilisation of solvent is sometimes desirable and this is readily achieved in our process by enclosing the rotating body in an evacuated chamber for example a chamber enclosing an atmosphere at a pressure in the range from 10 mm mercury down to 0.01 mm mercury. Heat and/or air circulation or an inert atmosphere may also be provided if necessary.

A multi-stage process may be operated by arranging for example a series of rotating bodies, preferably rotating about the same axis and also conveniently from the same driving unit. The product from the first body is discharged to the surface of the second where the second process is conducted and so on to the third or other successive bodies. One may arrange for different coating materials for each stage and build up multi-layer coatings on the original particulate solid.

The process of the invention employs rotation at high speeds and by "high speed" as used herein we mean speeds in excess of 100 rpm. The forces operating on the particulate solid causing it to move on the surface do not depend solely on the speed but they depend also on the physical dimensions of the rotating body e.g. the radius and angle the surface makes with the axis of rotation. Thus any choice of speed of rotation must be selected bearing in mind the size and shape of the surface of the body which is rotating. The centrifugal force may be measured by the acceleration of the particles on the surface of rotation. Our process works most effectively when accelerations of at least 50 m $sec^{-2}$ preferably at least 400 m $sec^{-2}$ are present on the surface of rotation.

The speed of rotation may vary over a wide range, in general speeds from 100 rpm up to 100,000 rpm are used but the range which is most useful is from 500 rpm to 10,000 rpm. The design of rotor bearings and rotating seals and feeds for the rotating body may be those known conventionally in engineering science.

The surface of rotation on which the coating process is conducted is preferably an "unbroken" surface by which we mean a surface which is circumferentially continuous without holes, gaps or ports or other discontinuities, but the surface may be ridged, undulating, convoluted or otherwise patterned if desired in order to improve the movement of the particulate solid and/or the coated product.

The surface of rotation on which the coating process of this invention takes place may be usefully an inert surface for example of glass, plastic, ceramic, metal or composite materials especially chemically resistant metals e.g. stainless steel, nickel, titanium and tantalum are preferred.

Flexible films may be used as materials for the rotating bodies which would be rigidified by the centrifugal force operating when they are rotating and they may constitute a cheap form of bowl or cylinder on which the process may be performed.

DETAILED DESCRIPTION OF THE DRAWINGS

Figure 1:
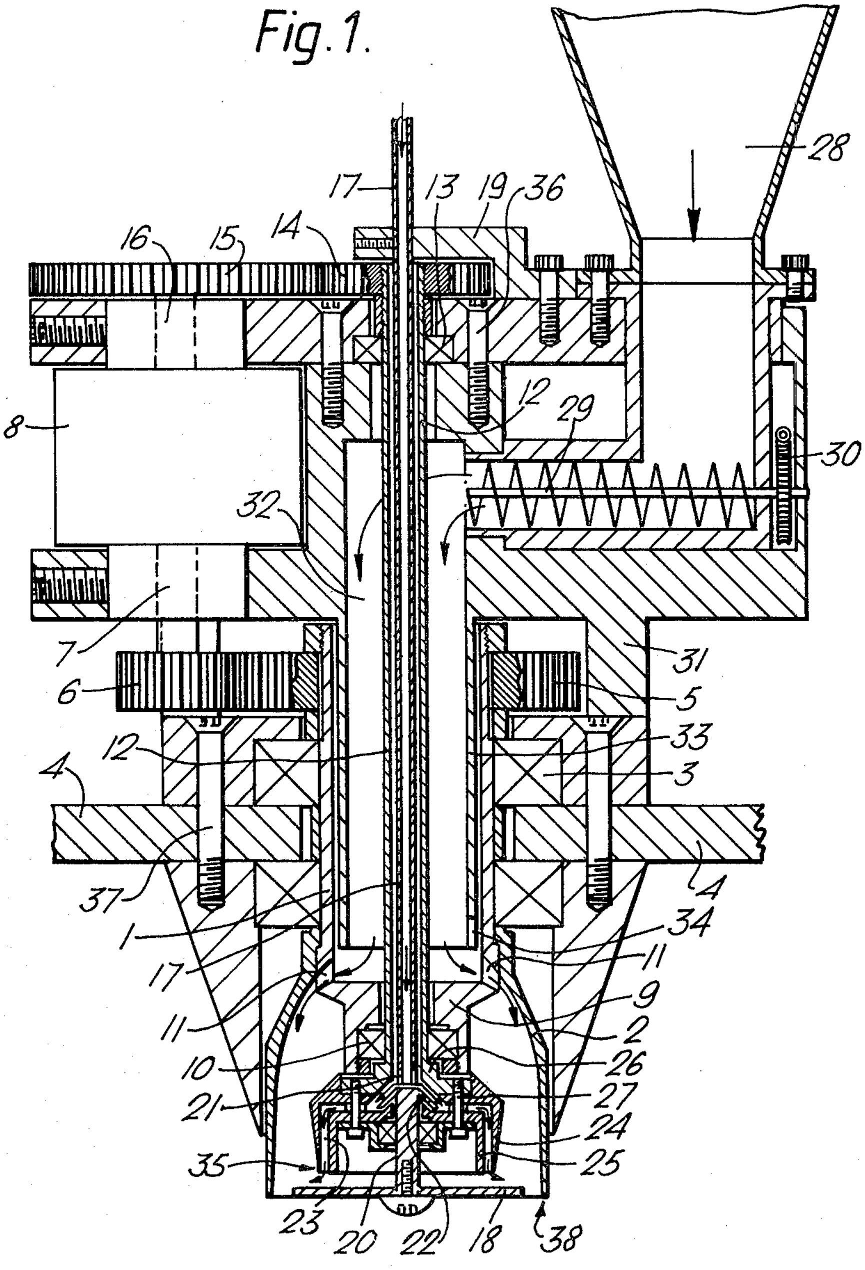
FIG. 1 is a side view, partly in cross section and partly in elevation, of one form of exemplary coating apparatus for practicing a process according to the present invention.

A suitable form of coating apparatus on which the process of the invention was performed will now be described by reference to FIG. 1.

A cylindrical tube (1) having a bell portion (2) is mounted through bearings (3) on a supporting flange (4) so that the tube and bell are capable of rotating about a vertical axis. The rotary power is provided through a gear wheel (5) attached to the tube (1) mating with a gear wheel (6) on the drive shaft (7) of a motor (8). Attached to the interior of the bell-shaped lower portion is a baffle (9) rotating on a bearing (10) which helps to steady the rotation of the tube (1) and the bell (2). Holes (11) around the circumference at the junction between tube (1) and bell (2) and baffle (9) allow access from the wall of tube (1) to the wall of the bell (2).

A second cylindrical tube (12) mounted on a vertical axis inside tube (1) is supported on bearings (13) and carries a gear (14) which engages with another gear (15) attached to a second upper drive shaft (16) of the motor (8). Thus tubes (1) and (12) may both rotate but at different speeds if required depending on the sizes of the mating gears, the relative motion between the tubes being taken up by the bearing (10).

A third cylindrical tube (17) placed inside tube (12) coaxially therewith is mounted statically on base disc (18) and positioned coaxially near the top by clamping arm (19) resting on the same framework (31) that also supports the motor (8) and flange (4) and which is held together by screws (36) and (37).

The lower end of the tube (17) terminates in a solid pillar (20) attached perpendicularly to the static horizontal base disc (18). A ring of holes (21) are drilled in the wall of tube (17) immediately above an external collar (22) which has a conical form leading to an annular channel (23) which is a continuation of the annular channel between the second and third vertical tubes (12) and (17) respectively. The continuation of this annular channel extends to an annulus between two cylindrically sided jars (24) and (25) attached (with their openings downwards) to the flanged end (26) of tube (12) by bolts (27) spaced with collars thereby capable of rotating with tube (12).

A hopper (28) incorporating an Archimedean screw feeder (29) driven by gear (30) from a power source (not shown) is mounted on the framework (31). The screw feeder leads into the annular cylindrical passage (32) between tube (12) and a static cylindrical baffle (33) terminates at (34) just short of a ring of holes (11) which allow material fed by the hopper (28) falling under gravity in the passage (32) to contact the inner concave parabola-shaped surface of the bell (2).

In operation the particulate solid to be coated is fed by the hopper (28) into the passage (32) through holes (11) onto the inner surface of the bell (2). The bell (2) and tube (1) together with baffle (9) are rotated at ca. 3000 rpm by the motor (8) through mating gears (5) and (6). Thus considerable acceleration is imparted to the particulate solid on the surface of the bell (2) and the solid travels downwards as a uniform layer running smoothly on the surface towards the rim (38) of the bell.

The coating material in liquid form (typically a solution in a reasonably volatile solvent) is pumped into tube (17) and runs down the tube through the holes (21) onto the upper surface of collar (22). From there the liquid coating solution will run into the annular channel and contact the surface of jars (24) and (25) which are also rotating with tube (12) driven through mating gears (14) and (15) from the same motor (8). The coating solution will form a thin film on the inner surface of the inverted jar (24) and travel towards the knife-edge rim (35) from which it will spray by means of the centrifugal force of the rotation of the jar. The liquid sprays over the particulate solid which in that region of the surface has established itself as a uniform layer under the influence of the rotation of the tube (1) and the bell (2). Thus the particles become uniformly coated with the solution and in that form reach the rim (38) of the bell and are discharged therefrom into the surrounding atmosphere.

Figure 2:
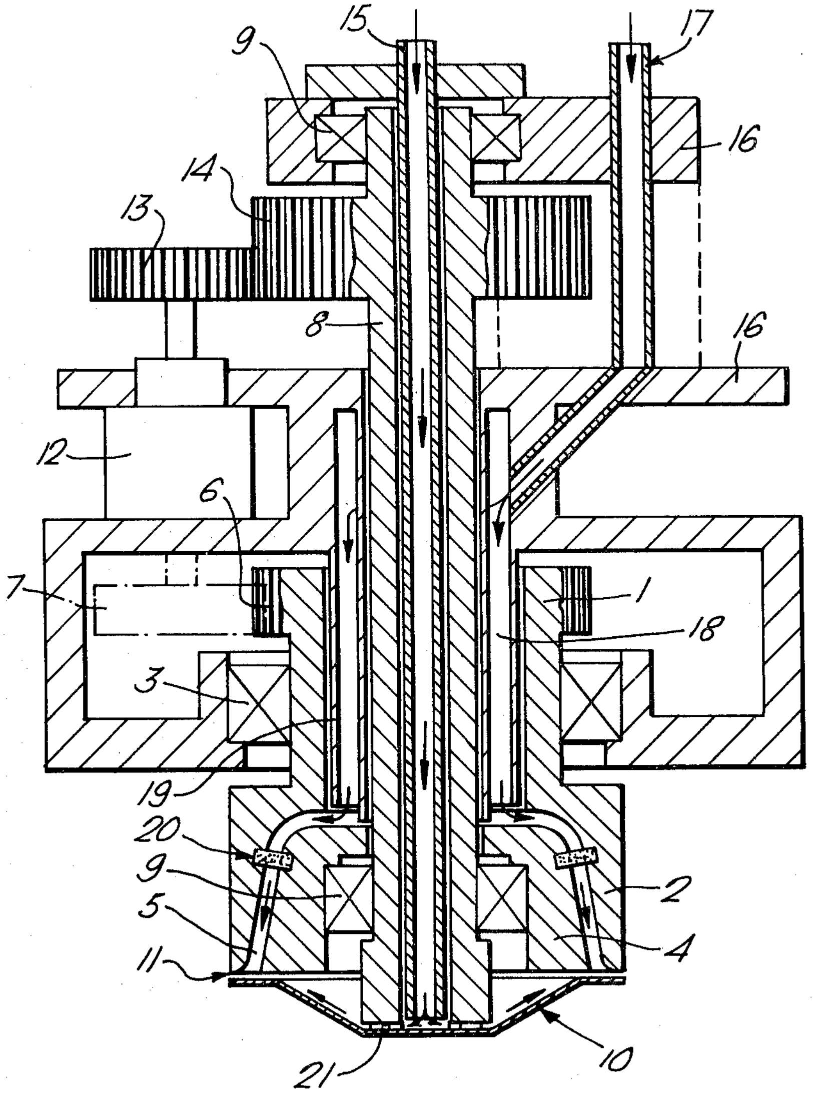
FIG. 2 is a side view, partly in cross section and partly in elevation, of another form of coating apparatus for practicing a process according to the invention.

A more preferred embodiment is shown in FIG. 2 and is described hereinafter.

A cylindrical tube (1) having a bell shaped portion (2) at its lower end is mounted through bearings (3) so that it is capable of rotation about a vertical axis. The bell portion has an inner body (4) attached to it by three screws and spacing bushes (20) such that the bell and body are separated from each other by a fixed gap (5) which forms an annular channel down which the solids to be coated can flow, fed from feeder tube (7) leading to the annular channel. Rotary power for the cylindrical tube, bell portion and inner body is provided by a motor (12) and its drive shaft with a gear wheel (7) which engages a gear wheel (6) attached to the cylindrical tube.

A second and longer cylindrical tube (8) mounted on bearings (9,9') is located inside the first tube capable of rotation independently thereof. At the lower end of this second tube is a dished flexible plate (10) of 'Melinex'* film 0.4 mm thick, attached to the end of the tube by three screws and spacers (21) such that a gap is formed between the end of the tube and the base of the dish. The horizontal outer rim of the dished plate is in close proximity of the flared rim of the bell portion of the first tube but there remains a critical gap width (11) between the two items. The tube and dished plate are driven in rotary motion about a vertical axis by a motor (12) with a gear wheel (13) on its drive shaft which engages a gear wheel (14) attached to the tube.

*"Melinex" is a Registered Trade Mark of Imperial Chemical Industries Limited

A third cylindrical tube (15) is placed inside the second tube and is mounted in a fixed position by a supporting disc which in turn is mounted on the support frame (16) which supports the motors and drive gear for the two other rotating tubes.

In operation, the coating material in liquid form (typically a solute in a reasonably volatile solvent) is pumped down the central tube (15) to the centre of the rotating disc (10). The disc rotates at typical speeds of approximately 500 rpm and preferably in a direction contrary to the rotatary direction of the first tube and bell portion. Under the action of pump pressure and gravity, the coating liquid travels from the centre of the dish, through the gaps formed by the spacers holding the dish to the drive tube and outwards under centrifugal force when the dish is rotating to the rim of the dish forming a thin layer of coating solution on the horizontal outer rim of the dish.

The particulate solids to be coated are fed from a hopper (not shown) to the feeding tube (17). The tube enters the annular space (18) formed by a stationary sleeve (19) between the two rotating cylindrical tubes. This conveys the solids to the annular gap between the rotating bell portion and its inner body which delivers the solids to the coating region which is the critical gap (11) formed where the flare of the bell portion meets the horizontal outer rim of the flexible dish which is rotating in the opposite direction and separated from the rim of the bell by a critical gap width. In this region the solids are rolled in the thin layer of coating solution on the rim of the dish, and thus become evenly coated with the solution before being ejected from the outer edge of either the bell portion and the dish by the action of centrifugal force. The coated solids are discharged into a drying chamber (not shown) and collected in a collection device which is built onto the drier. Any form of drier which utilises a vigorous hot air circulation may be used with the coating unit, provided that the coating is not damaged by abrasion within the drier.

The dimensions, shapes and relative placements of many of the components are optical and these options together with speeds or directions of rotation may be varied without significantly altering the use of the device.

A collection device (not shown) may be arranged to collect the coated solid after it has had time to dry in the atmosphere. In order to aid drying a low partial pressure, vigorous air circulation and heat is usefully provided in the region surrounding the rim (38). A novel collector/dryer as described in our copending UK Application may be used if desired.

The dimensions, shapes and relative placements of many of the components of the apparatus may be varied without significantly altering the process of the invention. For instance the relative positions of the jars (24) and (25) with respect to the bell (2) or more particularly with respect to the rim (38) of the bell (2) may be varied by arranging for the tubes (17) and (12) to be telescopic tubes and for bearings (10) to slide along tube (12) to a convenient position.

What we claim is:

1. A process for coating the particles of a particulate solid material, wherein (a) the particulate solid material is supplied to a supply zone on the surface of a rotating body, the surface being a surface of rotation facing towards the axis of rotation of the body and having concavity in the axial direction, (b) due to the acceleration imparted by the rotation of the body the particles of the solid material are caused to travel across the surface of rotation from the supply zone to a discharge zone axially remote from the supply zone, (c) coating material is brought into contact with the particulate solid and distributed over the surface thereof during its travel across the surface of rotation and (d) particles of the solid coated with coating material are discharged from the surface at the discharge zone using forces generated by the rotation of the body.

2. A process as claimed in claim 1 wherein the shape of the surface in the axial direction approximates to a parabola.

3. A process as claimed in claim 1 wherein the coating material is applied from a second rotating surface.

4. A process as claimed in claim 3 wherein the coating material is applied to the particulate material as the latter becomes adjacent the discharge zone of the surface of rotation.

5. A process as claimed in claim 3 wherein the second rotating surface is positioned close to the surface of rotation adjacent the discharge zone such that coating material is transferred to the particulate material by rolling the particulate material in the coating on the second surface.

6. A process as claimed in claim 5 wherein the second rotating surface is mounted co-axially with the other surface of rotation but is rotated at a different speed so as to roll the particulate material between the two surfaces.

7. A process as claimed in claim 6 wherein the second surface is a surface of a sheet of flexible material.

8. A process as claimed in claim 7 wherein the second surface is resiliently urged against the discharge zone of the surface of rotation.

* * * * *